Aug. 18, 1936.  C. G. QUICK ET AL  2,051,573
LATE NEWS MECHANISM FOR PRINTING MACHINES
Filed Jan. 5, 1933  10 Sheets-Sheet 1
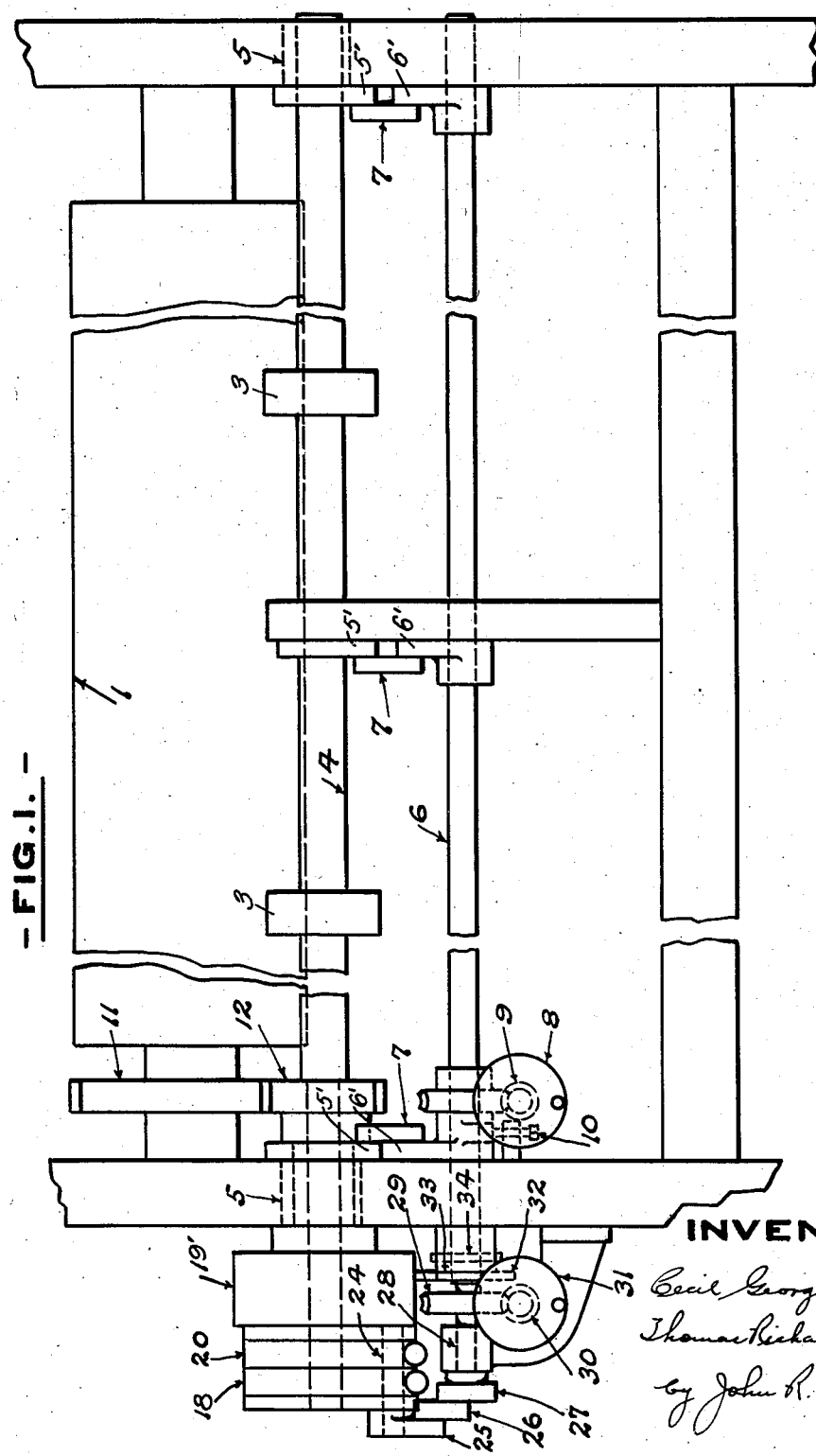
INVENTORS.
Cecil George Quick
Thomas Richard Bennett
by John R. Tomein
ATT'Y.

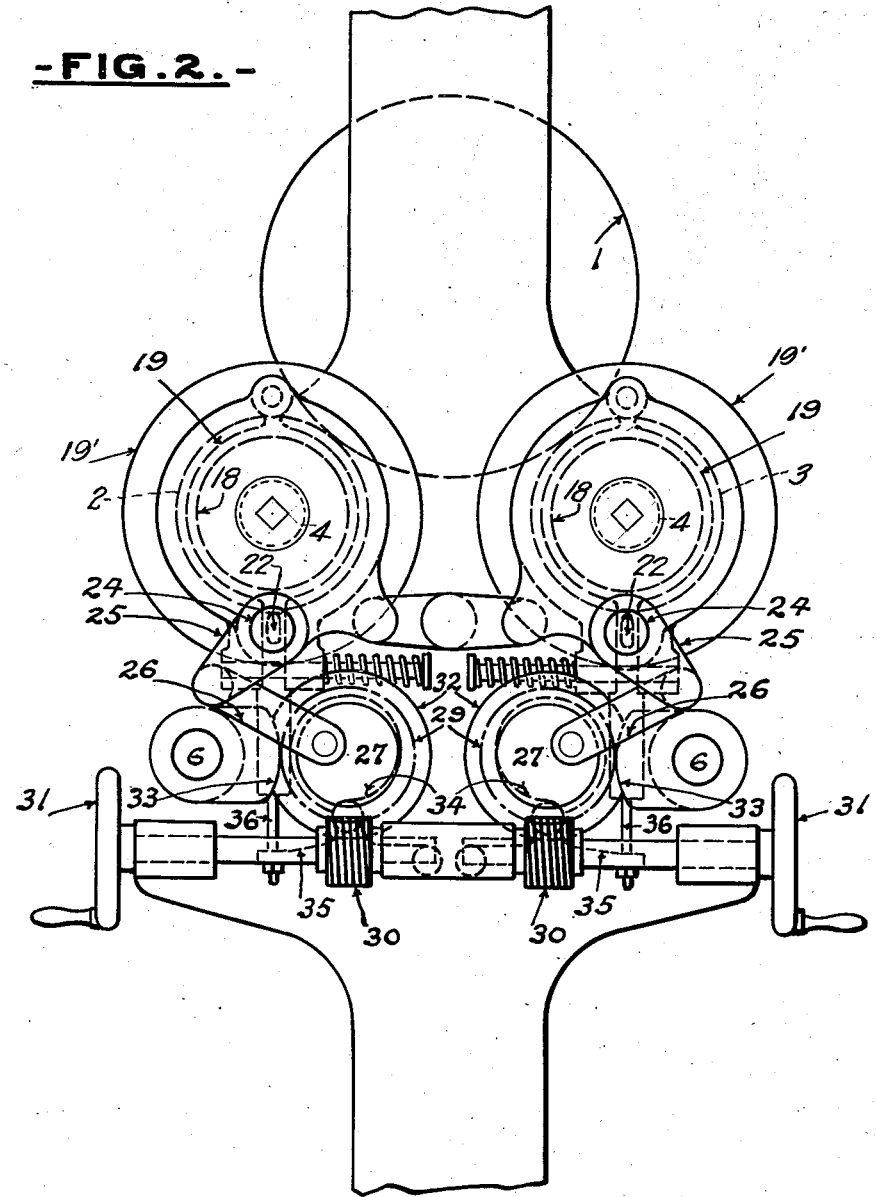

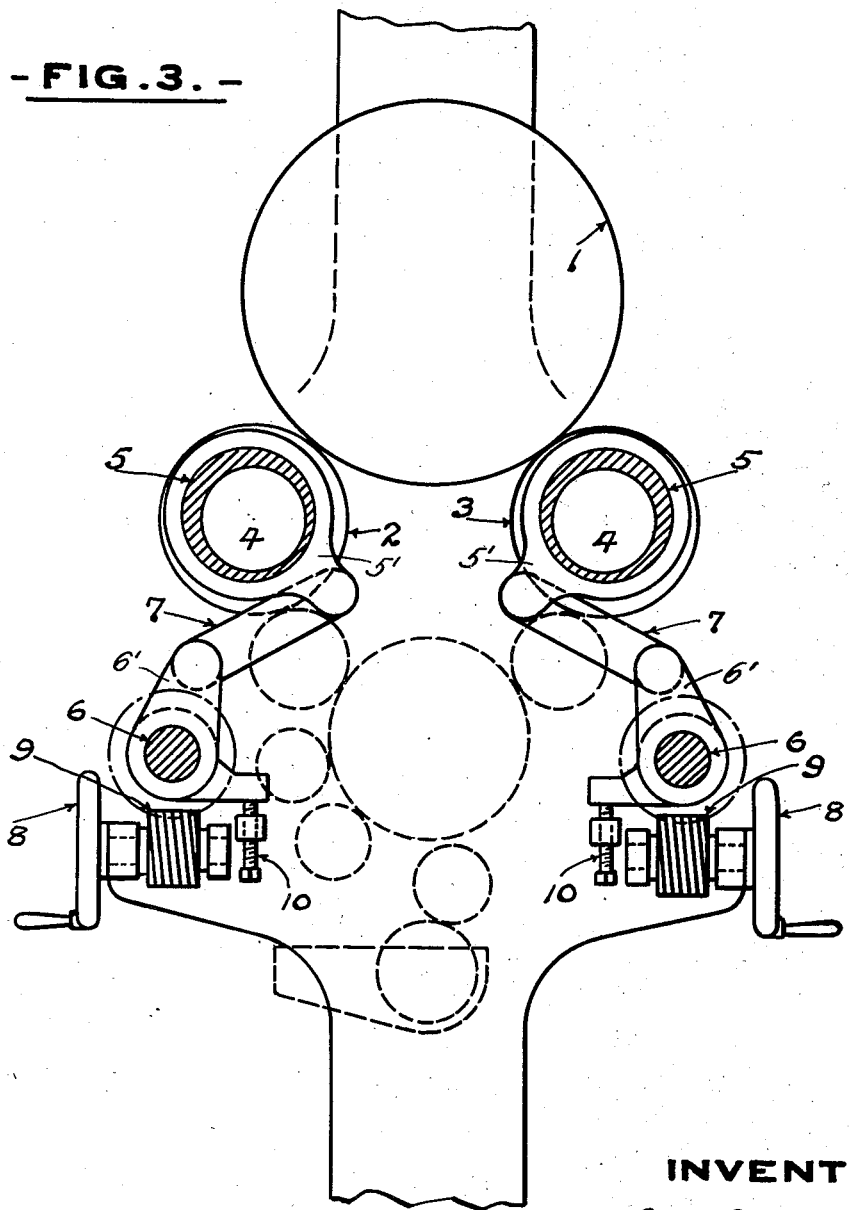

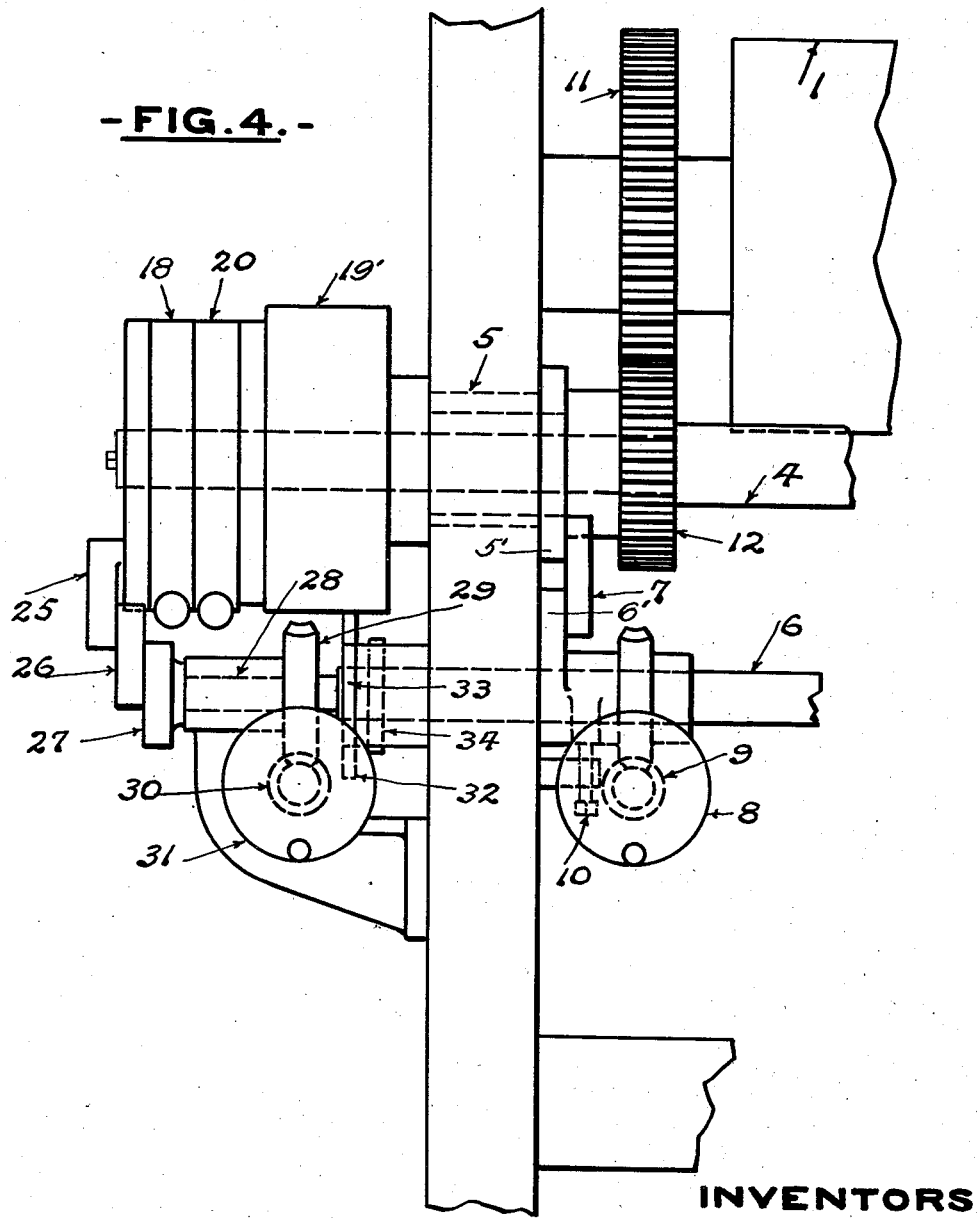

Aug. 18, 1936.  C. G. QUICK ET AL  2,051,573
LATE NEWS MECHANISM FOR PRINTING MACHINES
Filed Jan. 5, 1933  10 Sheets-Sheet 5
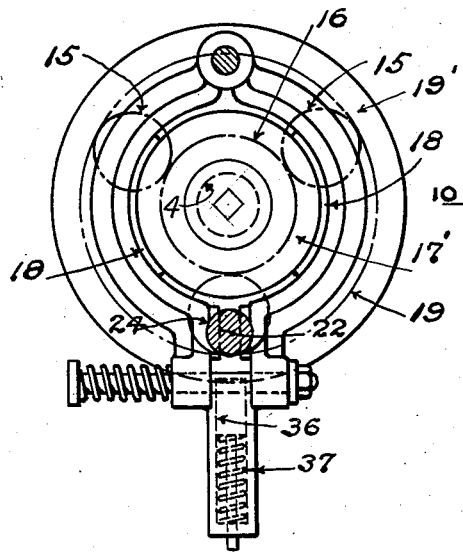
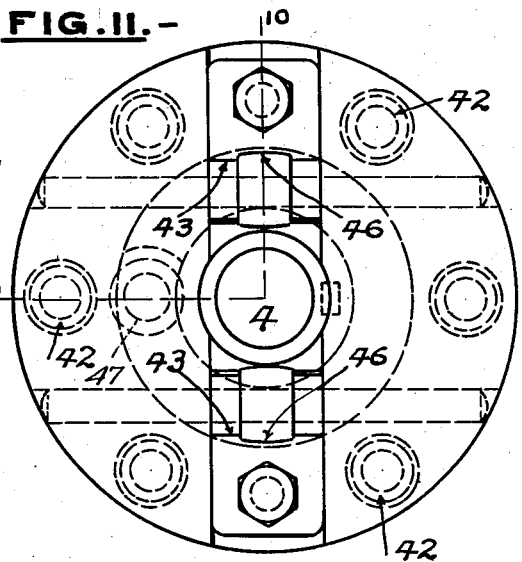
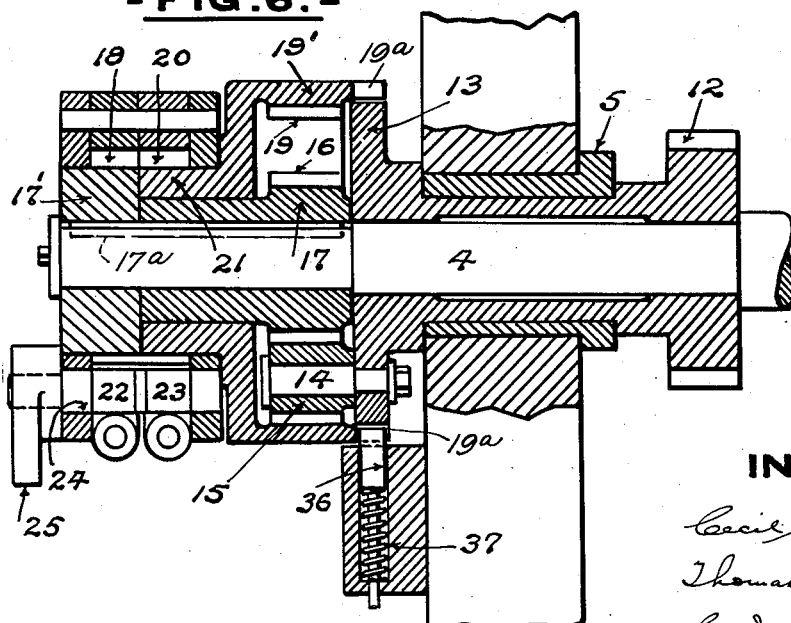
INVENTORS
Cecil George Quick
Thomas Richard Bennett
By John R. Tomlin
ATT'Y.

Aug. 18, 1936.  C. G. QUICK ET AL  2,051,573
LATE NEWS MECHANISM FOR PRINTING MACHINES
Filed Jan. 5, 1933    10 Sheets-Sheet 6
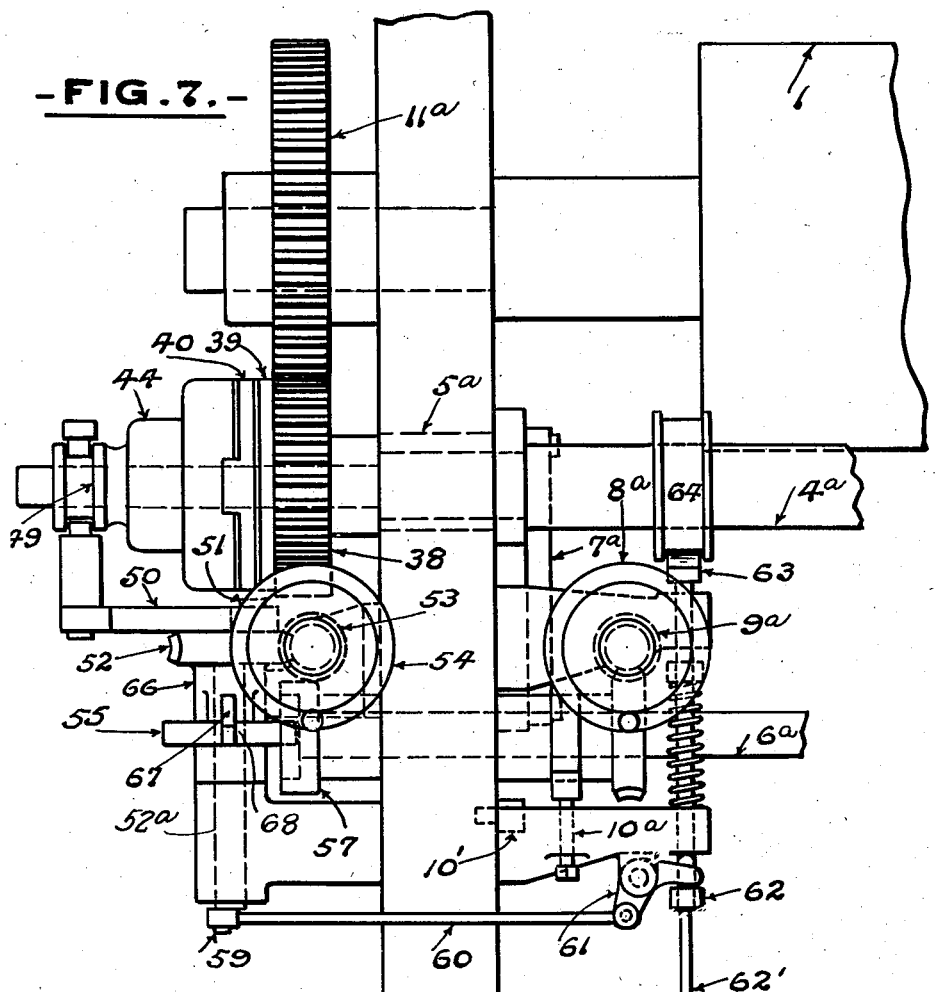
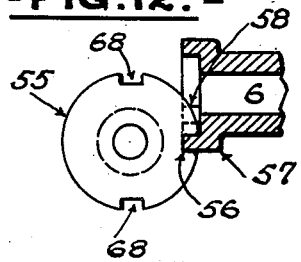
INVENTORS
Cecil George Quick
Thomas Richard Bennett
by John R. Towlin
ATTY.

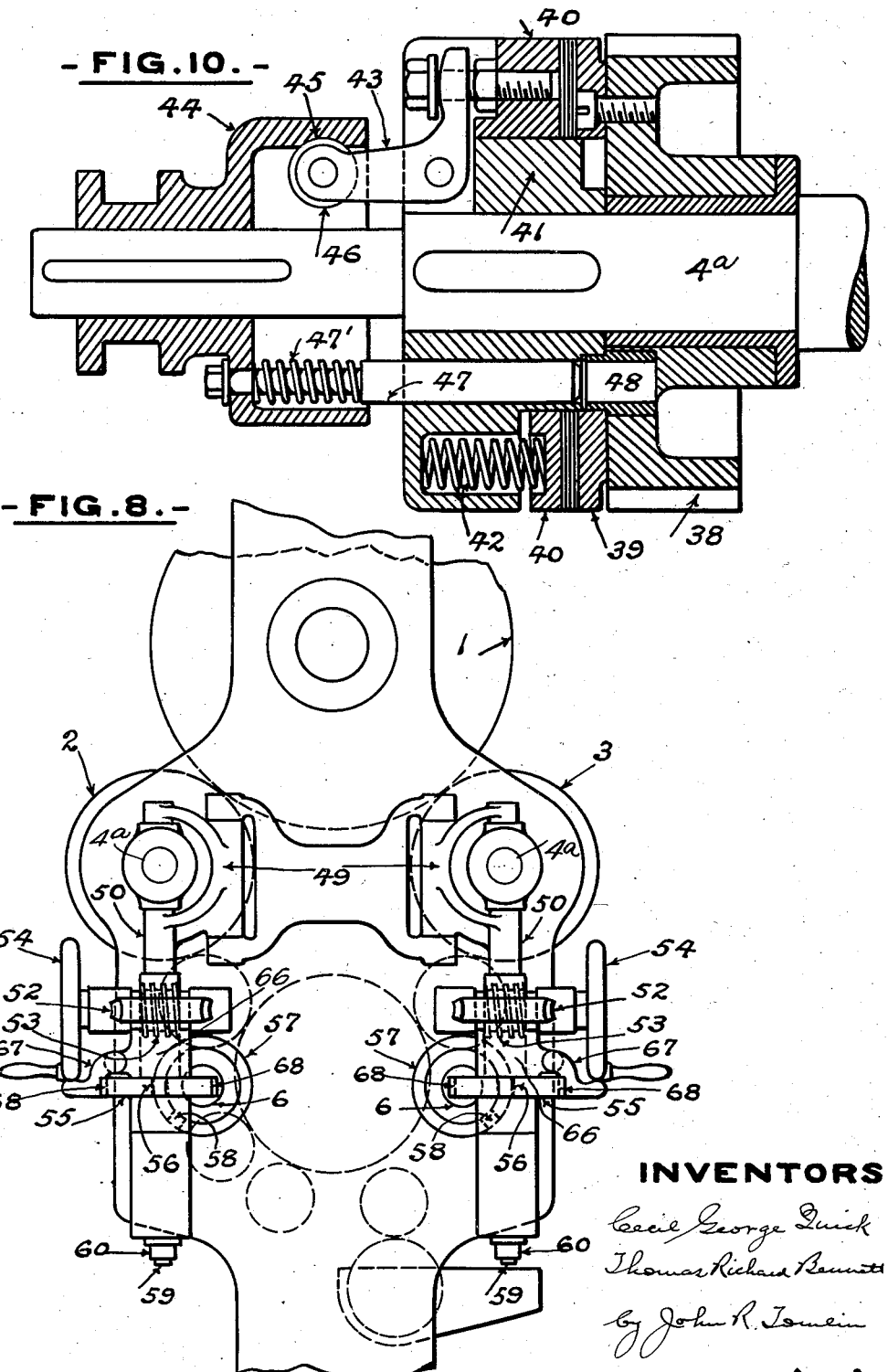

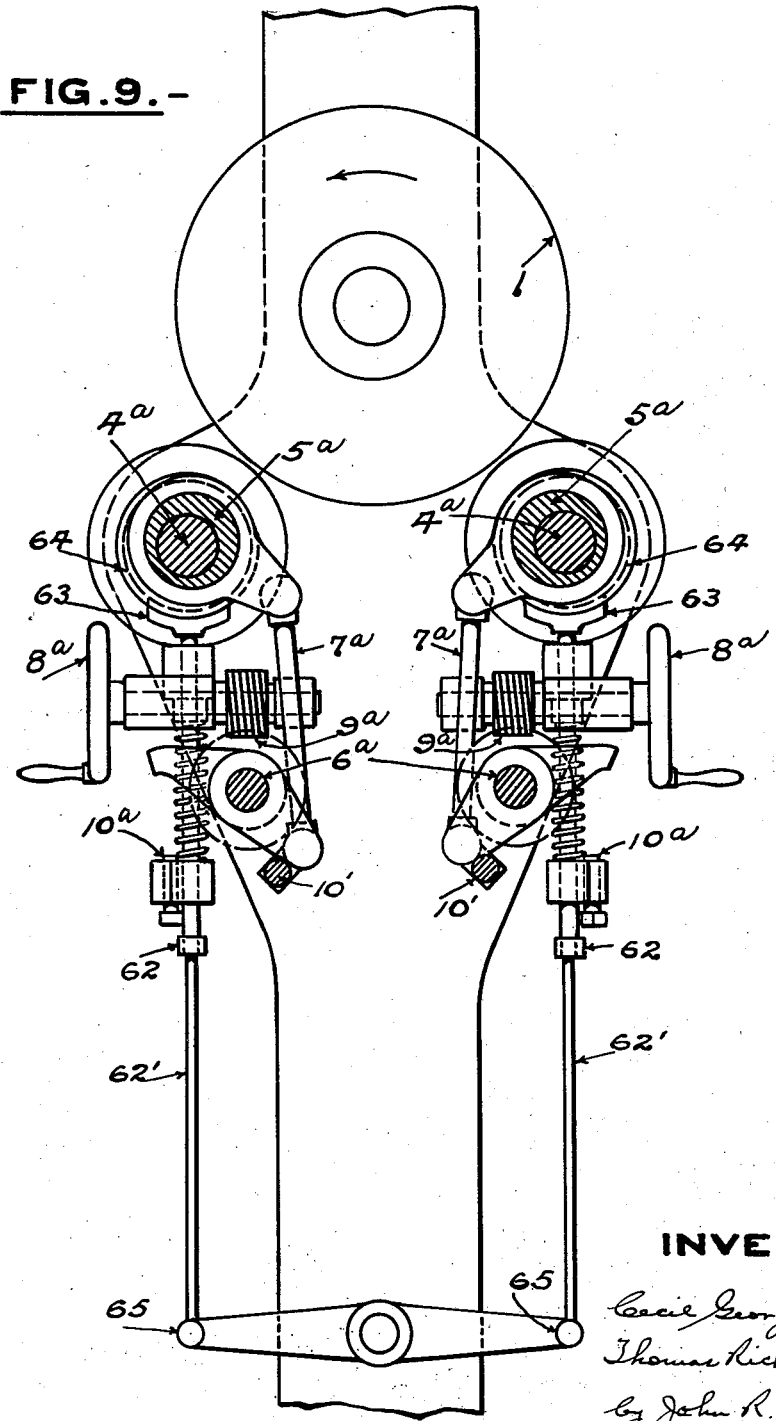

Aug. 18, 1936.  C. G. QUICK ET AL  2,051,573
LATE NEWS MECHANISM FOR PRINTING MACHINES
Filed Jan. 5, 1933  10 Sheets-Sheet 9
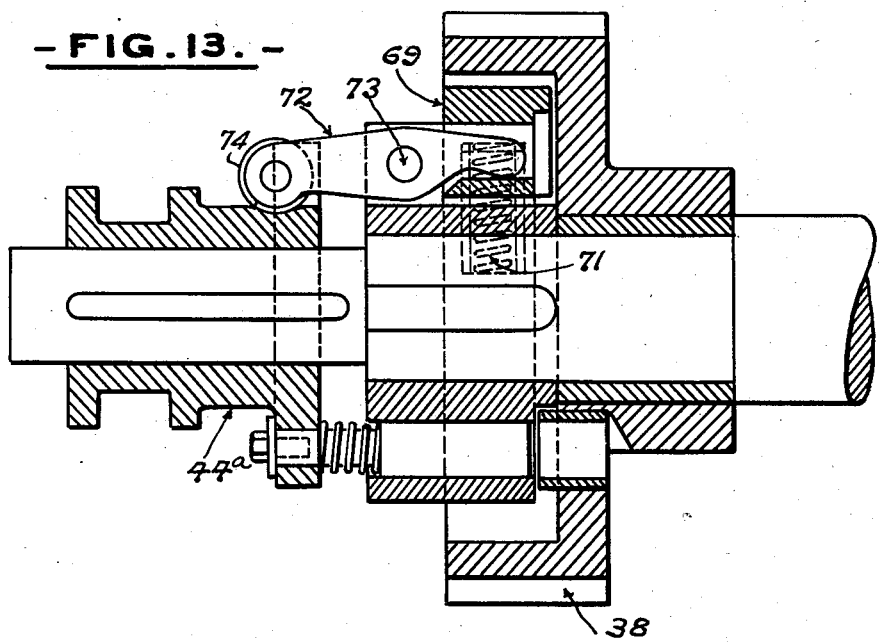
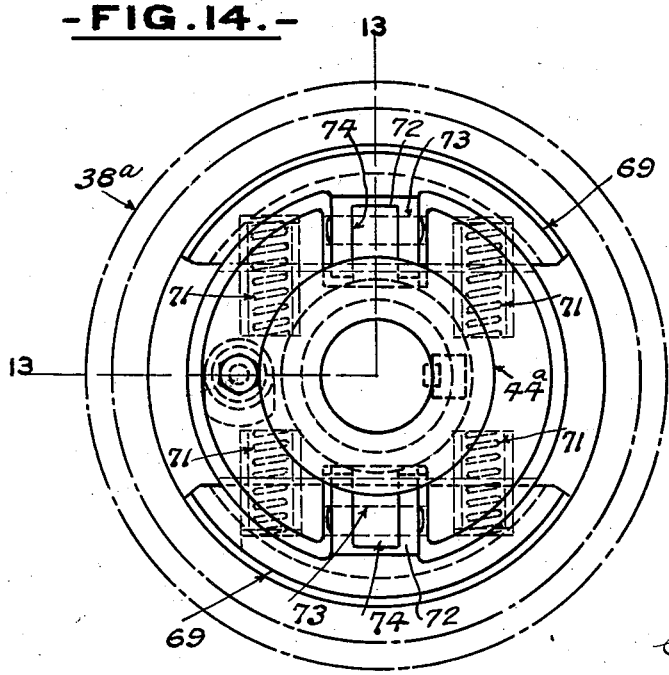
INVENTORS.
Cecil George Quick
Thomas Richard Bennett
by John R. Tomlin
ATT'Y.

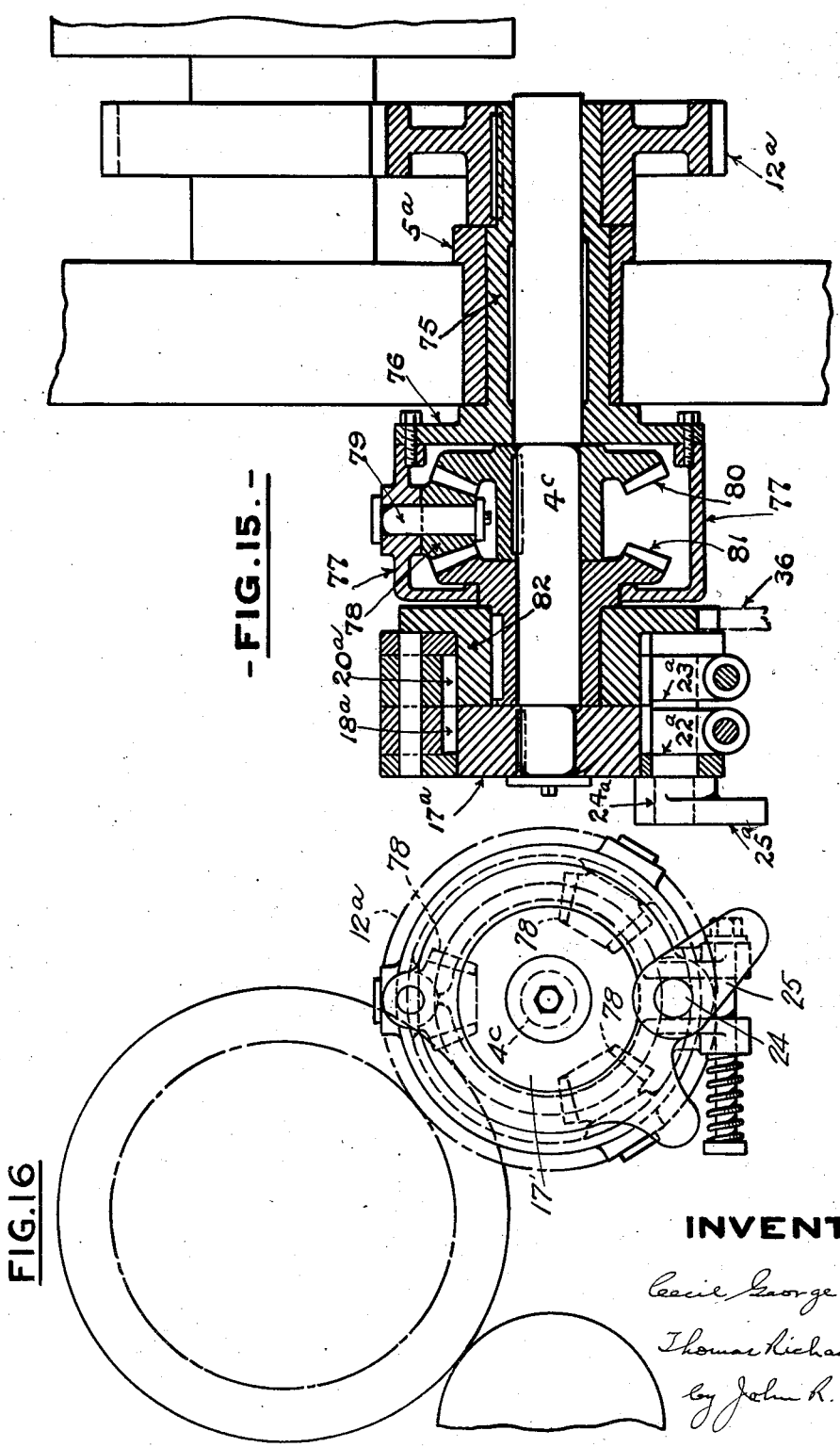

Patented Aug. 18, 1936

2,051,573

UNITED STATES PATENT OFFICE 2,051,573

LATE NEWS MECHANISM FOR PRINTING MACHINES

Cecil George Quick, Eltham, London, and Thomas Richard Bennett, Willesden, London, England, assignors, by mesne assignments, to R. Hoe & Co., Inc., New York, N. Y., a corporation of New York Application January 5, 1933, Serial No. 650,340
In Great Britain January 22, 1932

16 Claims. (Cl. 101—221)

This invention relates to improvements in or relating to late news and like mechanism for use in printing machines, and has for its principal object the provision of improved means whereby the substitution of one late news form for another may be achieved without stopping the printing machine during the run of an edition.

Another object is to provide improved means for equalizing the speed of either of a pair of printing cylinders with the speed of a coacting impression cylinder, and for providing circumferential register between the said cylinders.

A further object is to provide the combination of clutch-operated means for connecting the printing cylinder in drive connection with the impression cylinder, with means for automatically effecting the release of a brake which normally holds the printing cylinder stationary.

It is also an object of the invention to provide a late news device of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed.

The invention is illustrated in the accompanying drawings as applied to arrangements in which there are employed a plurality of printing cylinders arranged for independent cooperation with a common impression cylinder although it is to be understood that the invention is not confined in its application to the employment of a plurality of independent printing cylinders.

Several forms of the invention are shown in the accompanying drawings which forms are at present preferred by us, since the same have been found in practice to give satisfactory and reliable results, although it is to be understood that the various instrumentalities of which our invention consists can be variously arranged and organized and that our invention is not limited to the precise arrangement and organization of the instrumentalities as herein shown and described.

Figure 1 is a side elevational view of the invention;

Figure 2 is an end elevational view thereof;

Figure 3 is an end elevational view, partly in section;

Figure 4 is a fragmentary enlarged side elevational view, partly in section;

Figure 5 is an end elevational view;

Figure 6 is a fragmentary sectional detail view of the form of the invention shown in Figures 1 to 5 inclusive;

Figure 7 is a partial side elevational view of a modified form of the invention;

Figure 8 is an end elevational view of the form shown in Figure 7;

Figure 9 is an end elevational view, partly in section;

Figure 10 is a sectional view taken on line 10—10 of Figure 11;

Figure 11 is an elevational view of certain details shown in Figure 10;

Figure 12 is a further detail view of the modified form of the invention;

Figure 13 is a sectional view taken on line 13—13 of Figure 14, showing another modified form of the invention;

Figure 14 is an elevational view of certain details shown in Figure 13;

Figure 15 is a sectional view of a further modified form of the invention; and

Figure 16 is an end elevation of the form of the invention depicted in Figure 15, parts being diagrammatically shown.

Referring more particularly to Figures 1–6, 1 is an impression cylinder and 2, 3 late news printing cylinders which are adapted to cooperate independently with the impression cylinder, each printing cylinder being mounted upon a shaft 4. The term "printing cylinder" is intended to include the employment of a group of cylinders arranged to be actuated together, and such an arrangement as illustrated in Figure 1 in which each shaft 4 has thereon two printing cylinders. The mechanism hereinafter described is duplicated for each late news printing cylinder and the following description of one will apply to the other.

Each shaft 4 is supported in eccentric bushes 5 which can be caused partially to rotate to move its printing cylinder into and out of printing position by means of a transverse shaft 6 extending from one side of the machine to the other and connected to the bushes 5 by links 7. One terminal of each link 7 is pivotally connected to an arm 6' secured to the shaft 6, and the opposed terminal of the link is pivotally connected to an ear 5' formed on the flange of the eccentric bushing 5. Movement of the shaft 6 is effected through self-locking worm and worm wheel gearing 9 by means of a hand wheel 8, the worm wheel being fast on the shaft 6. The movement of the cylinder into impression position is regulated by stationary adjusting screws 10, and it will be seen that movement of the cylinder into and out of impression does not affect the setting of the adjusting screws 10, so that it is ensured that the cylinder will always be returned to that degree of impression pressure from which it was moved.

The shaft 4 is arranged to be driven from the impression cylinder shaft through gears 11, 12, and, in order to effect speeding up of the shaft, the gear 12 is freely mounted on the shaft 4 and is provided with a plate 13 having spindles 14 on which are mounted planet pinions 15. These planet pinions mesh with a gear 16 formed on a sleeve 17 secured to the shaft 4 having a drum 17' whose periphery is arranged to be engaged by a brake band 18. The sleeve 17 and drum 17' are secured against rotation relative to the shaft 4 and to each other by means of a key or feather 17ᵃ. The pinion also meshes with an internal gear 19 formed on a drum 19' rotatably mounted on the sleeve 17, and a second brake band 20 is arranged to engage a boss 21 formed as an extension of the drum 19'. The brakes 18 and 20 are controlled simultaneously by cams 22, 23 on an operating rod 24 adapted to be actuated by a lever 25; the cams are so displaced relatively to one another that when one brake band is applied the other is released and vice versa. The lever 25 is connected by a link 26 to a pin mounted eccentrically on a disc 27 fast on a shaft 28 having secured thereto a worm wheel 29 in mesh with a worm 30 arranged to be rotated by a hand wheel 31.

In order to prevent the printing cylinder from being moved into impression position until it has been speeded up to the speed of the impression cylinder, and, conversely, to prevent the drive to the cylinder from being disconnected before it has been moved out of impression, the shaft 28 is provided with a disc 32 having its periphery cut away to provide an arcuate recess 32ᵃ to receive in only one position the arcuate portion 33ᵃ of a mutilated disc 33 secured to the shaft 6 which through the disclosed instrumentalities effects movement of the printing cylinder into and out of printing position; also secured to the shaft 28 is another disc 34 whose periphery is cam shaped so as to operate a lever 35 which is connected to a locking plunger 36 adapted to enter one or other of a pair of recesses 19a formed in the drum 19', the lever 35 being urged towards the cam by a spring 37.

In operation, assuming that the printing cylinder is out of printing position, in which position the brake band 18 is "on" so that the drum 17' and sleeve 17 and thus the shaft 4 are rendered stationary, and the brake band 20 is "off" if it be desired to move the cylinder into printing position, it is first necessary to rotate the shaft 28 to thereby operate the brake bands 18 and 20 so as to cause the gears 11 and 12, and the planetary gears 15, 16 and 19 to effect speeding up of the printing cylinder before the cut away portion or arcuate recess 32ᵃ of the disc 32 will move into position to receive the arcuate portion 33ᵃ of the mutilated disc 33 to permit the shaft 6 to be rotated to move the printing cylinder into printing position. Rotation of the shaft 28 causes the brake band 18 to be released and the brake band 20 to be applied. This operation will cause the drum 19' to slow down and finally to stop so that the gears 12, 15, 19 and 16 will drive the sleeve 17 and thus the shaft 4. The drum 19' is locked in a definite position by the plunger 36 so as to ensure circumferential registration of the printing cylinder, because with regard to the impression cylinder the plunger 36 can only enter into a recess 19a in locking position when the drum 19' is in definite or predetermined positions. When the shaft 28 has been actuated in the manner described to speed up the printing cylinder, the arcuate recess 32ᵃ of the disc 32 lies in a position such that the arcuate portion 33ᵃ of the mutilated disc 33 can be moved therethrough. Movement of the shaft 6, which is effected by the hand wheel 8, causes the eccentric bushes 5 partially to rotate and thus to move the cylinder into impression position, the pressure being determined and limited by the adjustment of the screws 10.

The arcuate portion 33ᵃ of the disc 33 is positioned in the arcuate recess 32ᵃ of the disc 32 when the late news cylinder is in printing position, therefore it is necessary to rotate the shaft 6 and thus effect movement of the eccentric bushes 5 to move the cylinder out of printing position before the shaft 28 can be rotated to disconnect the drive to the cylinder.

It will be seen that each of the two printing cylinders can be operated independently. The arrangement according to the invention is comparatively simple, the planetary gear will ensure smooth and positive action and avoids the setting up of end thrust, and the provision of the second brake band enables the printing cylinder to be braked by movement of the same member (i. e. the member 24) which controls the drive.

In the modification illustrated in Figures 7–12, there is employed a modified form of mechanism for interlocking the movement of the cylinders into and out of printing position and the speeding up of the cylinders.

In this modification (which, as in the arrangement first referred to, will be described in connection with one printing cylinder, a similar arrangement being employed for the other cylinder) the gear wheel 11ᵃ is in mesh with a gear 38 which is loosely mounted on the shaft 4ᵃ and is provided with one part 39 of a friction clutch of the plate type; the other part 40 of the friction clutch is slidably mounted on a block 41 secured to the shaft, and the part 40 of the clutch is urged by a plurality of springs 42 and is controlled by bell crank levers 43. The levers 43 are, in turn, controlled by a sleeve 44 slidably mounted on an extension of the shaft, this sleeve being provided with recesses 45 adapted to receive bowls or rollers 46 mounted on the bell crank levers; this sleeve is also provided with a pin 47 which is urged by a spring 47' so as to be adapted to snap into a bushed aperture 48 formed in the gear 38. Movement of the sleeve is effected through an actuating trunnion 49 which can be rocked by means of a link 50 pivotally mounted on a pin 51 eccentrically secured to a worm wheel 52 in mesh with a worm 53 operable by a hand wheel 54. In this arrangement also the worm wheel 52, which is operably supported by a shaft 52ᵃ, is fast through the shaft 52ᵃ with a disc 55 having a cut away portion 56 which is arranged to interlock with a flange 57 also having a cut away portion 58, the flange being secured to the shaft 6ᵃ by movement of which the cylinder is moved into and out of printing position. The worm wheel 52 is also fast through its shaft 52ᵃ with an eccentric pin 59, connected by a link 60 to a bell crank lever 61 which operates through a collar 62 on a rod 62' to apply or to release a brake 63 from a brake drum 64 secured to the shaft 4ᵃ. This rod 62' is also connected to a transverse foot bar 65 which extends substantially from one side of the machine to the other.

Interposed between the worm wheel 52 and the disc 55 is a sleeve 66 having mounted thereon a latch 67 which can drop into, when the parts are in and out of printing position respectively, one or other of a pair of notches 68 formed in the disc 55.

In this modification, the parts for effecting movement of the cylinder into and out of printing position are substantially the same as those described with reference to Figures 1 to 6, except that additional limiting screws 10' are provided for limiting the movement of the cylinder out of printing position. Certain components are illustrated in this modification, and inasmuch as their functions have been hereinbefore disclosed in the description of the form of the invention illustrated in Figures 1 to 6, these components are designated by reference characters similar to those employed in Figures 1 to 6 but with the addition of exponent $a$.

In operation, assuming that the printing cylinder is in its non-printing position, the part 40 of the clutch and also the pin 47 are in their disengaged position. When it is desired to move the cylinder into printing position it is first necessary, as in the arrangement described with reference to Figures 1-6, to move the hand wheel 54 so as to move the disclosed drive components of the device to effect speeding up of the printing cylinder before the cut away portion or recess 56 of the disc 55 will move into alinement with the flange 57 to allow rotation of the shaft $6^a$ to move the cylinder into printing position. Rotation of this hand wheel 54 will, through the link 50 and trunnion 49, cause the sleeve 44 to move to the right so as to allow the bowl or roller 46 to drop into the recess 45 formed in the sleeve 44; this movement allows the springs 42 to throw the part 40 of the clutch into engagement with the part 39, and thus the shaft $4^a$ and hence the printing cylinder will be speeded up through the friction clutch. Further movement of the hand wheel 54 will cause the sleeve 44 to depress the lever 43 and thus cause the part 40 of the clutch to be disengaged. The pin 47 which is now pressed by its spring 47' against the face of the gear 38 is now in a position to snap into the recess 48 formed in the gear when, by reason of the slight relative movement between the two parts of the clutch, the recess overtakes the pin. Thus it will be seen that the printing cylinder is first speeded up through the friction clutch 39, 40 and then positively driven through the pin 47 in a definite relationship with the impression cylinder.

At this stage of the operation the cut away part or recess 56 of the disc 55 is in line with the flange 57 on the shaft $6^a$ which can now be turned to cause the cylinder to be moved into impression position by movement of the eccentric bushes, as described with reference to Figures 1-6. Similarly when the cylinder is in printing position it is necessary to move it to its non-printing position before the cut-away part or recess 58 on the flange 57 moves into alinement with the disc 55 to allow the drive to be disconnected.

Before any control can be exercised upon the cylinder drive it is necessary to lift the latch 67 to allow the hand wheel 54 to be turned.

In a modification shown in Figures 13 and 14 the friction clutch is in the form of semi-circular internally expanding brake shoes 69, which are normally urged by springs 71 to engage the interior surface of a boring formed in the gear $38^a$.

Movement of the clutch into and out of clutching position is under the control of a lever 72 pivotally mounted at 73 and provided with a bowl or roller 74 which is under the control of a sleeve $44^a$, as in the arrangement described with reference to Figures 7-12.

It will be seen that with the arrangements described in Figures 7-14, the reaction to the pressure of the springs 42 or 71 is taken radially by the sleeves 44 or $44^a$ so that no end thrust is exerted; and the movement of the sleeve being at right angles to the line of thrust can easily be effected.

In the modification shown in Figure 15, a differential gear is employed for effecting speeding up of the printing cylinders. In this arrangement the gear $12^a$ is secured to a sleeve 75 having a flange 76 carrying the cage 77 of a differential gear, the pinions 78 of which are rotatably mounted on axles 79 carried by the cage: these pinions are in mesh wtih gears 80, 81 of which the gear 80 is fast with the shaft $4^c$, and the gear 81 is fast with the brake drum 82, the two brakes $18^a$, $20^a$ being arranged as has been described.

The drum 82 is arranged to be engaged by a locating pin 36, as has been disclosed in the description of Figures 1 to 6. It will be seen that the operation of this differential gear arrangement is similar to the operation described with reference to the planetary gear of Figures 1-6.

It will be understood that the invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

What we claim is:

1. In a printing mechanism, the combination of a late news printing cylinder, a cooperating impression cylinder, a planetary gear system for transmitting drive between the impression and printing cylinders, means for so controlling the planetary gear system that the printing cylinder can be speeded up to the speed of the impression cylinder and in proper circumferential register therewith, means for moving the printing and impression cylinders relatively to one another into and out of printing position, and devices for so interlocking the first and second means that in moving from a non-printing position the first means must be actuated first to effect speeding up and registration before the second means can be actuated to effect movement of the cylinders into printing position and vice versa when moving from a printing position.

2. Mechanism as claimed in claim 1 in which means are provided for automatically applying a brake to the printing cylinder when the drive thereto is disconnected.

3. In a printing mechanism, the combination of a late news printing cylinder, a cooperating impression cylinder, a planetary gear system for transmitting drive between the impression and printing cylinders, means for so controlling the planetary gear system that the printing cylinder can be speeded up to the speed of the impression cylinder and in proper circumferential register therewith, means for moving the printing and impression cylinders, relatively to one another into and out of printing position, and devices for so interlocking the first and second means that in moving from a non-printing position the first means must be actuated first to effect speeding up and registration before the second means can be actuated to effect movement of the cylinders into printing position and vice versa when moving from a printing position, and means for automatically applying a brake to the printing cylinder when the drive thereto is disconnected, and a second brake for normally holding the printing cylinder stationary, said brakes being operated alternately by a single operating member.

4. In a printing mechanism, the combination of a late news printing cylinder, a cooperating impression cylinder, a planetary gear system for transmitting drive between the impression and printing cylinders, means for so controlling the planetary gear system that the printing cylinder can be speeded up to the speed of the impression cylinder and in proper circumferential register therewith, means for moving the printing and impression cylinders relatively to one another into and out of printing position, and devices for so interlocking the first and second means that in moving from a non-printing position the first means must be actuated first to effect speeding up and registration before the second means can be actuated to effect movement of the cylinders into printing position and vice versa when moving from a printing position, and eccentric bearings for moving the printing cylinder into and out of printing position.

5. In a printing mechanism, the combination of a late news printing cylinder, a cooperating impression cylinder, a planetary gear system for transmitting drive between the impression and printing cylinders, means for so controlling the planetary gear system that the printing cylinder can be speeded up to the speed of the impression cylinder and in proper circumferential register therewith; means for moving the printing and impression cylinders relatively to one another into and out of printing position, and devices for so interlocking the first and second means that in moving from a non-printing position the first means must be actuated first to effect speeding up and registration before the second means can be actuated to effect movement of the cylinders into printing position and vice versa when moving from a printing position, and rotatable eccentric bearings for moving the printing cylinder into and out of printing position, said bearings being limited in their return to printing position by adjustable stops.

6. In a printing mechanism, the combination of a late news printing cylinder, a cooperating impression cylinder, a planetary gear system for transmitting drive between the impression and printing cylinders, said planetary gear system comprising a rotatable member driven from the impression cylinder, a pinion operably supported by the rotatable member, a gear rotatable with the late news printing cylinder and meshing with the pinion, a second gear rotatable concentrically relative to the gear which is rotatable with the late news printing cylinder and meshing with the pinion, a brake for controlling the second rotatable member, means for so controlling the planetary gear system that the printing cylinder can be speeded up to the speed of the impression cylinder and in proper circumferential register therewith, means for moving the printing and impression cylinders relatively to one another into and out of printing position, and devices for so interlocking the first and second means that in moving from a non-printing position the first means must be actuated first to effect speeding up and registration before the second means can be actuated to effect movement of the cylinders into printing position and vice versa when moving from a printing position.

7. In a printing mechanism, the combination of a late news printing cylinder, a cooperating impression cylinder, a planetary gear system for transmitting drive between the impression and printing cylinders, said planetary gear system comprising a rotatable member driven from the impression cylinder, a pinion operably supported by the rotatable member, a gear rotatable with the late news printing cylinder and meshing with the pinion, a second gear rotatable concentrically relative to the gear which is rotatable with late news printing cylinder and meshing with the pinion, means for so controlling the planetary gear system that the printing cylinder can be speeded up to the speed of the impression cylinder, means for moving the printing and impression cylinders relatively to one another into and out of printing position, means for obtaining register between the cylinders, said means including a plunger which is arranged to lock the second gear in definite position, and devices for so interlocking the first and second means that in moving from a non-printing position the first means must be actuated first to effect speeding up and registration before the second means can be actuated to effect movement of the cylinders into printing position and vice versa when moving from a printing position.

8. In a printing mechanism, the combination of a late news printing cylinder, a cooperating impression cylinder, a worm gearing, a planetary gear system for transmitting drive between the impression and printing cylinders, means actuated by the worm gearing for so controlling the planetary gear system that the peripheral speeds of the printing cylinders are synchronized with the peripheral speed of the impression cylinder, means actuated by the worm gearing for moving the printing and impression cylinders relative to one another into and out of printing position, and devices for so interlocking the first and second means that in moving from printing position the first means must be actuated first to effect speeding up and registration before the second means can be actuated to effect movement of the cylinders into printing position and vice versa when moving from a printing position.

9. In a printing mechanism, the combination of a late news printing cylinder, a cooperating impression cylinder, a planetary gear system for operably connecting the printing cylinder and the impression cylinder, manually controlled means for synchronizing the peripheral speed of the printing and impression cylinders and for locking said cylinders in operative registration, manually controlled means for moving the printing and impression cylinders into and out of printing position, and interlocking means for preventing operative engagement of the printing and impression cylinders before the synchronization of their peripheral speeds and establishment of operative registration.

10. In a printing mechanism, the combination of late news printing cylinders, a drum rotatable with each printing cylinder, a cooperating impression cylinder, driving means operably connecting the printing and impression cylinders and having components including a plurality of intermeshing gears and gear supporting members, brake members selectively engaging the drum and a component of the driving mechanism to thereby arrest rotary motion of the printing cylinders and to synchronize the peripheral speeds of the printing and impression cylinders, means for locking the printing and impression cylinders in operative registration, means for moving the printing and impression cylinders into and out of operative engagement, and interlocking means for preventing operative engagement of the printing and impression cylinders before the synchronization of their peripheral speeds and establishment of their operative registration.

11. In a printing mechanism including an impression cylinder, the combination of a late news printing cylinder, a shaft for operably supporting the late news printing cylinder, a planetary gear system for transmitting drive between the impression and printing cylinders, the planetary gear system including a rotatable member driven from the impression cylinder, a pinion operably supported by the rotatable member, a gear rotatable with the late news printing cylinder and shaft and meshing with the pinion, a drum rotatable with the printing cylinder and shaft, a second gear rotatable concentrically relative to the gear which is rotatable with the late news printing cylinder and shaft and meshing with the pinion, and a brake mechanism including separate operable components for operably engaging the second gear and drum for controlling the rotation of the late news printing cylinder and shaft through the planetary gearing system and for arresting rotary motion of the printing cylinder and shaft.

12. In a printing mechanism including an impression cylinder, the combination of a late news printing cylinder, a drum rotatable with the printing cylinder, a gear system for transmitting drive between the impression and the late news printing cylinders, the gear system including a rotatable member driven from the impression cylinder, a pinion operably supported by the rotatable member, a gear rotatable with the late news printing cylinder and in mesh with the pinion, a second gear rotatable independently of the late news printing cylinder and in mesh with the pinion, and a brake mechanism including separate operable components for operably engaging the second gear and drum for controlling the rotation of the late news printing cylinder through the gear system and for arresting rotary motion of the printing cylinder.

13. In a printing mechanism including an impression cylinder, the combination of a late news printing cylinder, a drum rotatable with the printing cylinder, a gear system for transmitting drive between the impression and the late news printing cylinders, the gear system including a rotatable member driven from the impression cylinder, a pinion operably supported by the rotatable member, a gear rotatable with the late news printing cylinder and in mesh with the pinion, a second gear rotatable independently of the late news printing cylinder and in mesh with the pinion, and a brake mechanism including separate operable components for operably engaging the second gear and drum for synchronizing the peripheral speeds of the impression cylinder and the late news printing cylinder through the gear system and for arresting rotary motion of the printing cylinder.

14. In a printing mechanism including an impression cylinder, the combination of a late news printing cylinder, a drum rotatable with the printing cylinder, a gear system for transmitting drive between the impression and the late news printing cylinders, the gear system including a rotatable member driven from the impression cylinder, a pinion operably supported by the rotatable member, a gear rotatable with the late news printing cylinder and in mesh with the pinion, a second gear rotatable independently of the late news printing cylinder and in mesh with the pinion, and a brake mechanism including separate operable components for operably engaging the drum and second gear for arresting the rotation of the late news printing cylinder and for synchronizing the peripheral speeds of the impression cylinder and the late news printing cylinder through the gear system, and means cooperating with the gear system for establishing registration between the impression cylinder and the late news printing cylinder.

15. In a printing mechanism, a late news printing cylinder, an impression cylinder, rotary members, driving means controlled by the rotary members for synchronizing the circumferential speed of the printing cylinder with the circumferential speed of the impression cylinder, means for effecting circumferential registration between the cylinders, means including a rotary actuating member for moving the printing cylinder to and from printing engagement with the impression cylinder, a rotary component carried by the rotary synchronizing member, a rotary component carried by the rotary cylinder moving member, the said rotary components interengaging to lock the printing cylinder moving member against movement until the cylinder synchronizing and registering means have been moved to synchronizing and registering positions.

16. In a printing mechanism, the combination of a plurality of late news printing cylinders, an impression cylinder, means for independently synchronizing the peripheral speeds of the printing and impression cylinders, means for providing operative register between the cylinders, separate means for moving each printing cylinder independently relative to the impression cylinder and to each other into and out of operative engagement with the impression cylinder, and separate movable members operative with components of the said cylinder synchronizing means, said cylinder registering means and said cylinder moving means, the separate movable members operatively interengaging each other to prevent the operative engagement of the printing and impression cylinders before the synchronization of their peripheral speeds and establishment of operative registration.

CECIL GEORGE QUICK.
THOMAS RICHARD BENNETT.